Jan. 27, 1970 HISAO OKADA ET AL 3,492,415

LINE SEQUENTIAL COLOR TELEVISION SYNCHRONIZATION SYSTEM

Filed July 1, 1966 4 Sheets-Sheet 1

INVENTORS
HISAO OKADA
MASAHARU ITOH
MINORU MORIO

BY Ward, Haselton, McElhannon, Orme, Brooks & Fitzpatrick
ATTORNEYS

LINE SEQUENTIAL COLOR TELEVISION SYNCHRONIZATION SYSTEM

Filed July 1, 1966 4 Sheets-Sheet 2

INVENTORS
HISAO OKADA
MASAHARU ITOH
MINORU MORIO
BY
Ward, Haselton, McElhannon, Orme, Brooks & Fitzpatrick
ATTORNEYS LINE SEQUENTIAL COLOR TELEVISION SYNCHRONIZATION SYSTEM
Filed July 1, 1966 4 Sheets-Sheet 3

INVENTORS
HISAO OKADA
MASAHARU ITOH
MINORU MORIO
BY
Ward, Haselton, McElhannon, Orme, Brooks & Fitzpatrick
ATTORNEYS Jan. 27, 1970 HISAO OKADA ET AL 3,492,415

LINE SEQUENTIAL COLOR TELEVISION SYNCHRONIZATION SYSTEM

Filed July 1, 1966 4 Sheets-Sheet 4

INVENTORS
HISAO OKADA
MASAHARU ITOH
MINORU MORIO

BY Ward, Haselton, McElhannon, Orme, Brooks & Fitzpatrick
ATTORNEYS

United States Patent Office 3,492,415
Patented Jan. 27, 1970

3,492,415
LINE SEQUENTIAL COLOR TELEVISION SYNCHRONIZATION SYSTEM

Hisao Okada, Masaharu Itoh, and Minoru Morio, Tokyo, Japan, assignors to Sony Corporation, Tokyo, Japan, a corporation of Japan Filed July 1, 1966, Ser. No. 562,171
Claims priority, application Japan, July 2, 1965, 40/39,664
Int. Cl. H04n 5/38, 5/44; H04l 7/00
U.S. Cl. 178—5.4 3 Claims

ABSTRACT OF THE DISCLOSURE

In a color television receiver for receiving line sequential color video signals in which every third horizontal synchronizing pulse is attenuated, a first separator detects the intermittent unattenuated horizontal synchronizing pulse portions of such color video signals and correspondingly drives a color switching circuit for producing color switching signals controlling the color output of a color picture tube, preferably of the chromatron type, and a second separator detects all of the horizontal synchronizing pulse portions of the color video signals and produces corresponding pulses of uniform amplitude driving the horizontal and vertical deflection circuits by which beam scan is effected within the color picture tube while the grid of the latter has the color video signals applied thereto.

This invention relates to improvements to color television systems and it is particularly suitable for use in connection with color television systems of the line sequence type.

Among the various features of the subject invention are the attainment of stable color synchronization, high color fidelity, stable operation (even in the presence of noise) and relative simplicity in circuit arrangement.

The present invention is also suited for use in closed circuit color television systems and systems which employ video tape recorders.

Other features and advantages of the present invention will become more apparent from the following detailed description of an illustrative embodiment, taken in conjunction with the accompanying drawings in which:

FIG. 3 is an enlarged fragmentary view of a portion of a color picture tube used in the present invention;

FIG. 1 shows in dotted outline a picture taking and transmitting (or studio) portion 10 of a color television system according to the present invention. There is also shown in dotted outline a signal receiving and picture reproducing portion 12 of the same color television system.

In the transmitting portion 10 there are provided three separate picture taking cameras, the tubes of which are shown at 14, 16 and 18. These camera tubes are each sensitive only to one color light, i.e., red, green or blue.

The photosensitive plate within each camera is scanned electronically in known manner; and a deflection circuit 20 is provided to supply the necessary signals so that the three tubes will be scanned in synchronism. The scans require both horizontal and vertical movement over the tube plates; and for this purpose there are provided separate horizontal and vertical synchronizing pulse generators 22 and 24 which are connected to the deflection circuit 20.

Figure 2:
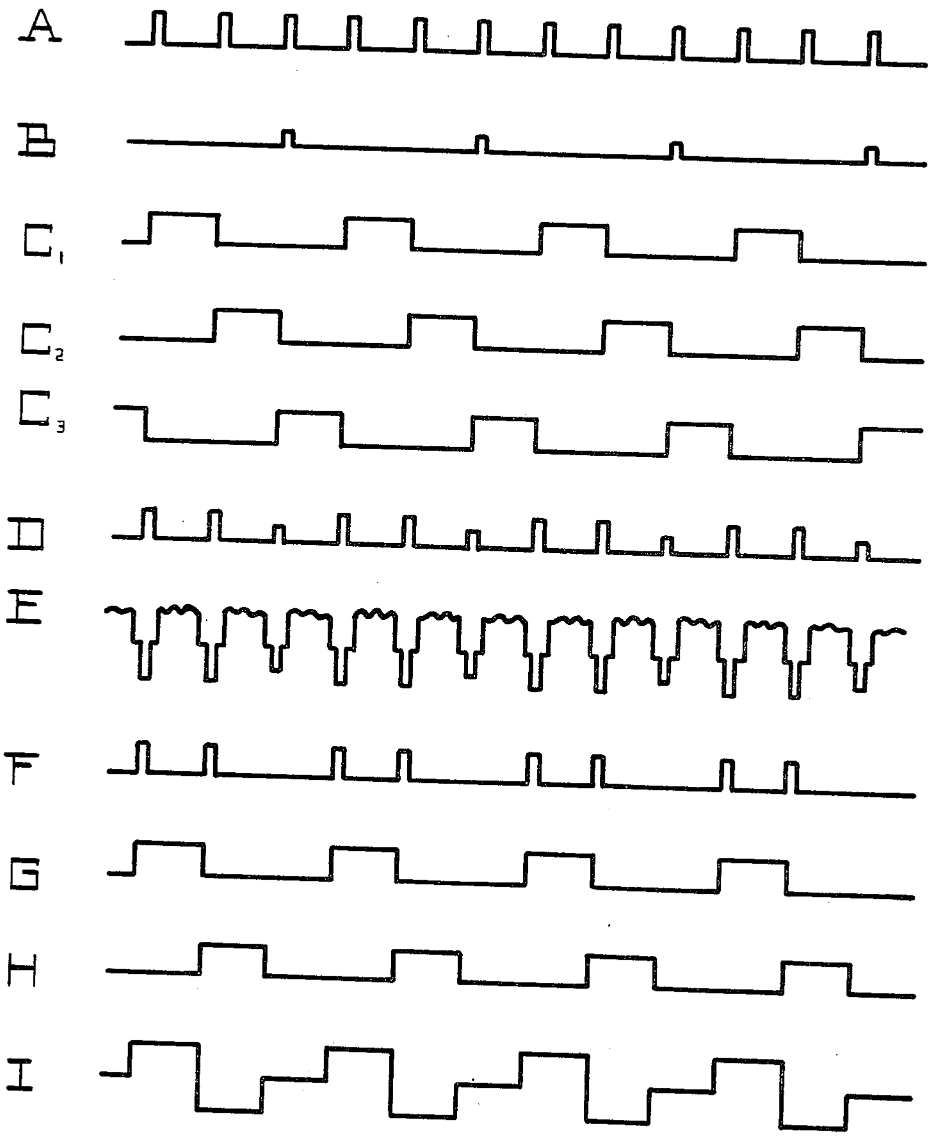
FIG. 2 is a series of waveforms showing the time relationship of signals at various locations in the system of FIG. 1.

The output of the horizontal pulse generator 22 is additionally supplied to a divider circuit 26 which extracts every third pulse (see FIG. 2B) and supplies it to a gate signal forming circuit 28. The gate signal forming circuit 28 is synchronized by these third pulses and it produces output voltages successively on three separate output terminals 30, 32 and 34. These output voltages which are shown as $C_1$, $C_2$ and $C_3$ in FIG. 2, are supplied to associated gate circuits 36, 38 and 40 to control the output signals from each of the camera tubes 14, 16 and 18. As a result there are obtained gated green, blue and red signals which occur in sequence.

The gated signals from the camera tubes are then supplied to a combining circuit 42 which produces a line sequence color signal. This color signal is modified in a processing circuit 44 to produce the signals shown at E in FIG. 2. The processing circuit 44 receives pulses from a pulse combining circuit 46 which in turn is connected to receive the horizontal and vertical synchronizing pulse from the pulse generators 22 and 24 and to additionally receive every third horizontal synchronizing pulse as extracted by the divider circuit 26. The pulse combining circuit 46 produces pulses having every third horizontal synchronizing pulse reduced in amplitude.

The composite video signals having the above described synchronizing pulses superimposed thereon (FIG. 2E) are transmitted via a transmission link 50 to the receiving portion 12 of the system.

In the receiving portion 12 there is provided a video amplifier 52 which processes and amplifies the video portions of the incoming signals and applies them to a grid 54 of a television color picture tube, such as a chromatron tube 56. This tube is of the line sequence type; and as shown in exaggerated manner in the fragmentary portion of FIG. 3 its face plate is formed with phosphor deposits arranged along parallel vertical strips 58. These phosphor deposits are specially treated so that each adjacent strip emits light of a different color when activated by an electron beam in the tube 56. As shown, the color sequence of the phosphors is a "majority red" or red-green-red-blue-red sequence.

There is provided a switching grid 60 which is embedded in the non-red portions of the phosphor deposits. This grid when switched electrically as by application of selected voltage thereto serves to direct the electron beam generated within the tube 56 to only those phosphor regions of a particular color.

The tube 56 is additionally provided with horizontal and vertical beam deflection coils 62 which provide the necessary beam scan over the face of the tube to generate a visual reproduction of the transmitted picture.

Signals from the video amplifier 52 also pass to a first synch separator 64. This device responds to the input video signals and reproduce only the intermittent horizontal synchronizing pulses shown in FIG. 2F; the attenuated pulses being suppressed. These intermittent pulses then pass to a color switching signal generator 66 (shown in dotted outline). The color switching signal generator, which may be of the type conventionally employed with chromatron tubes, comprises a first rectangular wave signal generator 68, a second rectangular wave signal generator 70 and a combining circuit 72. The first generator 68 is controlled by alternate ones of the intermittent pulses shown in FIG. 2F to produce the rectangular wave output shown in FIG. 2G. The second generator 70 is controlled either by the remaining pulses shown in FIG. 2F, or by the output of the first signal generator 68 through a connection indicated in dotted outline at 74; and it produces the rectangular wave output shown in FIG. 2H.

The output signals from the two rectangular wave signal generators 68 and 70 are combined in the circuit 72 in a manner such that they form a stepped or sequential divergence pattern as shown in FIG. 2I. These signals are then applied to the tube switching grid 60 for controlling the color output of the tube in the conventional manner for chromatron tubes.

The output of the video amplifier 52 is additionally supplied to a second synch separator 75 which operates to extract from the video signals, horizontal synch pulses of uniform amplitude as shown in FIG. 2A. These uniform horizontal synch pulses are then applied to a horizontal and vertical deflector circuit 76 which operates the beam deflection coils 62 of the tube 56.

Figure 1:
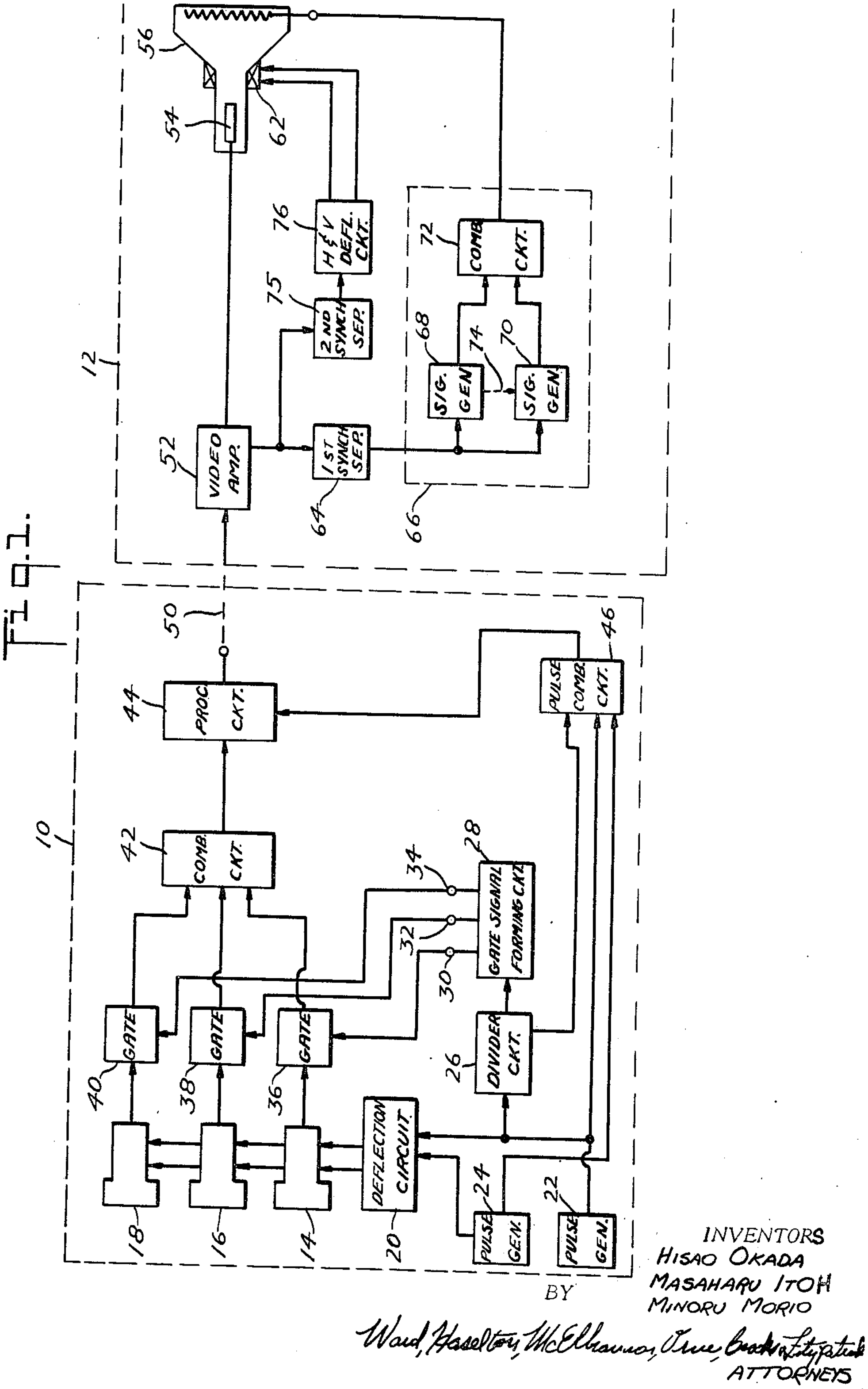
FIG. 1 is a block diagram illustrating the general arrangement of a television system according to the present invention.
Figure 4:
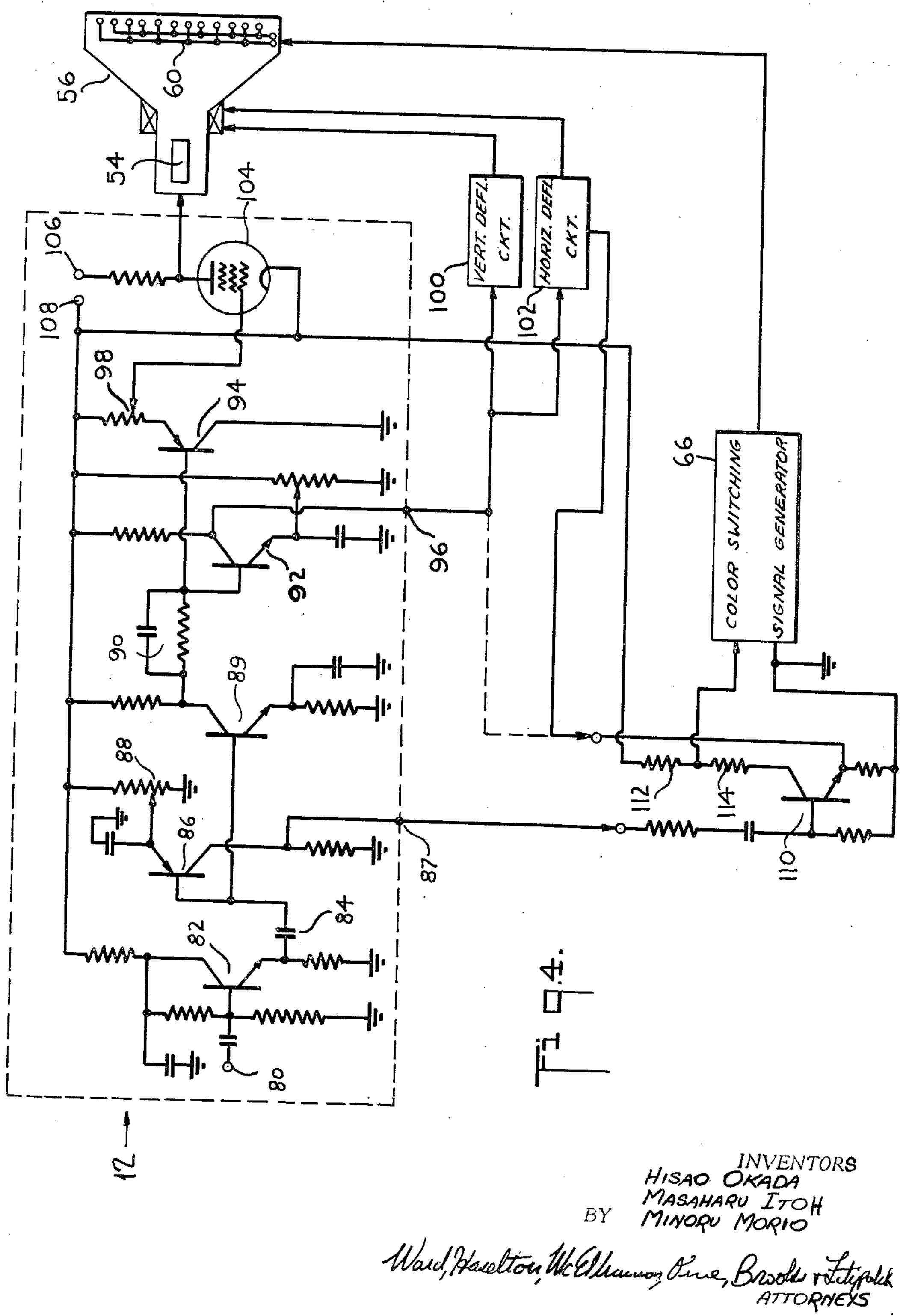
FIG. 4 is a circuit diagram showing in detail a modified arrangement of the receiving portion of the system of FIG. 1.

FIG. 4 shows in detail a somewhat modified version of the receiving portion 12 of the system of FIG. 1. As can be seen in FIG. 4 input signals from the transmission link 50 are applied (after being converted to video frequency) to an input terminal 80. At this point the input signals are as shown in FIG. 2E, that is, they have horizontal synch pulses superimposed thereon, with every third pulse suppressed. These signals are then applied to the base terminal of a first transistor 82 where they are amplified. The output from the transistor 82 is then coupled, via a coupling capacitor 84 to the base of a second transistor 86. This second transistor serves to clip and separate the intermittent (full amplitude) horizontal synch pulses from the vedio signals. These intermittent pulses are taken from the collector of the transistor 86 and are supplied to a color switching terminal 87. Meanwhile, the emitter of the second transistor is connected to an adjustable voltage divider or potentiometer 88 which permits adjustment of the clipping level of the intermittent synch pulses. The second transistor 86 additionally serves to maintain a charge across the coupling capacitor 84 so that a continuous D-C bias is provided at the base of a third transistor 89. This third transistor is also connected via the capacitor 84 to the output of the first transistor 82 and further amplifies the video signals received from it. The D-C bias maintains the third transistor in proper condition for distortionless amplifications of the video signals.

The amplified video output from the third transistor 89 is passed through a resistance-capacitance circuit 90 and supplied to the base terminals of fourth and fifth transistors 92 and 94. The fourth transistor 92 operates to clip and separate all the horizontal synch pulses, including the attenuated third pulses, from the video signals and to supply at a horizontal synch terminal 96 a series of uniform pulses. As shown, these pulses are taken from the collector of the fourth transistor 92. The emitter of that transistor meanwhile is connected to a variable voltage divider or potentiometer 98 for adjusting the pulse clipping level of the horizontal synch pulses.

The horizontal synch terminal 96 is connected to vertical and horizontal deflection circuits 100 and 102 which generate the scanning sweep voltages for the picture tube 56. The outputs from these circuits are connected to the corresponding beam deflection coils 62 of the tube.

The fifth transistor 94 provides further amplification for the video signals received from the third transistor 89. These signals are again amplified in a vacuum tube 104. From there they are applied to the grid 54 of the picture tube 56. The vacuum tube 104 is powered from a connection 106 to a high voltage source (not shown); while the five transistors are powered from a common terminal 108 to a low voltage source (not shown).

The color switching terminal 87 is resistively and capacitively connected to supply the intermittent (full amplitude) horizontal synch pulses to the base of a gating transistor 110. The emitter of the gating transistor is connected to the horizontal deflection circuit 102 to receive the voltages produced in that circuit. Alternatively the emitter of the gating transistor 110 may, as shown in dotted outline, be directly connected to the horizontal synch terminal 96. Outputs from the gating transistor 110 are taken from between a pair of resistors 112 and 114 which are connected in series between its collector and the common terminal 108 leading to the not shown low voltage source. This output is used to drive the color switching signal generator 66. As indicated previously this generator is connected to operate the tube switching grid 60 for controlling the color output of the picture tube 56.

It will be appreciated that the above described circuit provides for very stable operation of the switching signal generator 66. This is because any noise which may be associated with the intermittent signals is eliminated by virtue of the gated horizontal synch pulse obtained from the horizontal deflection circuit 102; or from the horizontal synch terminal 96.

Figure 5:
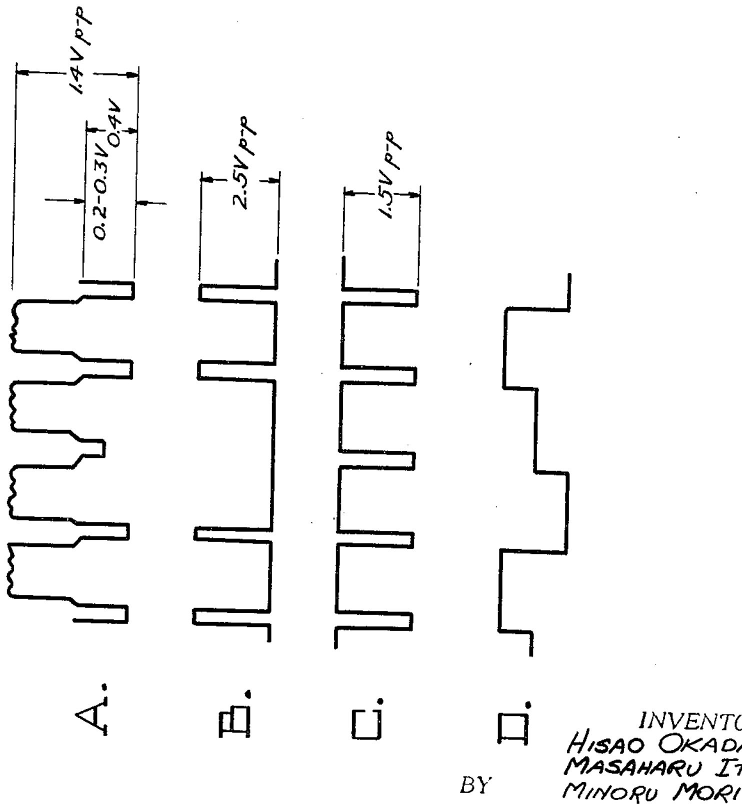
FIG. 5 is a series of waveforms showing further aspects of the signals in various locations along the circuit of FIG. 4.

The waveforms of FIG. 5 illustrate with greater accuracy the voltage waveforms which may be obtained in a circuit arrangement according to FIG. 4. As shown in curve 5A the total signal level at the input to the video portion of the receiving system is 1.4 volts peak to peak. The video portion of the signal is 1 volt, while the total horizontal synch pulse portion is 0.4 volt. The attenuated horizontal synch pulse portion of every third pulse is reduced to a value of 0.2 to 0.3 volt.

The curve 5B shows the intermittent synch pulse supplied to the gating transistor 110. These pulses are all 2.5 volts peak to peak. The curve 5C shows the horizontal synch pulses which appear at the horizontal synch terminal 96. These pulses occur in continuous and uniform time intervals and have a uniform amplitude of 15 volts peak to peak. The stepped color switching signal from the output of the switching signal generator 66 is shown in the curve 5D.

It will be appreciated that this system provides very stable color television pictures as a result of the uniform horizontal synch pulses obtained from the input video signals, and the control of the vertical and horizontal deflection circuits from these pulses.

Figure 6:
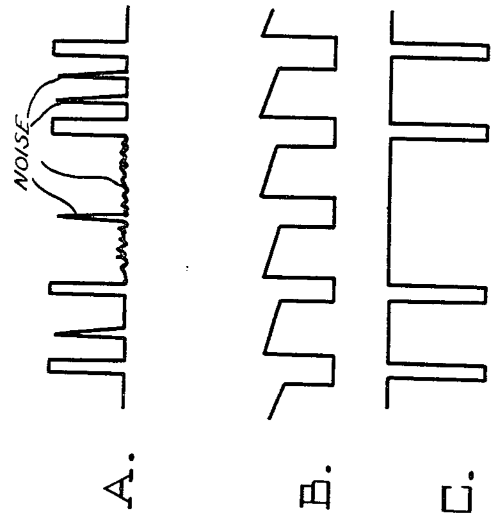
FIG. 6 is a series of waveforms illustrating the relationship of signals when the circuit of FIG. 4 is used in conjunction with a video tape recorder.
Figure 8:
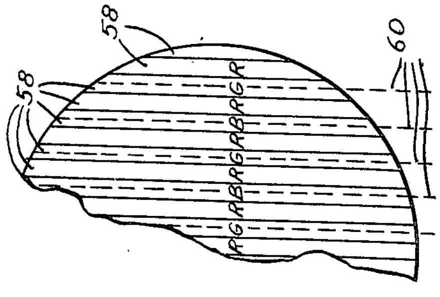

FIG. 6 shows a series of waveforms corresponding to the previously shown waveforms but including the various noises which are characteristic of the reproduction signals of video tape recorders. The waveform 6A is made up of the intermittent pulses interspersed with noise. The waveform 6B shows the gating signals which appear at the horizontal deflection circuit 102. Finally the waveform 6C shows the gated intermittent pulses which are supplied to the switching signal generator 66.

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended thereto.

What is claimed as new and desired to be secured by Letters Patent is:

1. In a color television system, means for producing line sequential color video signals of which every third horizontal synchronizing pulse is attenuated, first signal separating means for separating out the intermittent unattenuated horizontal synchronizing pulse portions of said color video signals and providing an output constituted of corresponding pulses of uniform amplitude, second signal separating means for separating out all the horizontal synchronizing pulse portions from said color video signals and providing an output constituted of corresponding pulses of uniform amplitude, a color switching circuit for producing color switching signals to be applied to control the color output of a color picture tube, means connecting said color switching circuit to be driven by said output of said first signal separating means, horizontal and vertical deflection circuits for producing an electron beam scan within said picture tube, said deflection circuits being connected to be driven by said output of said second signal separating means, and means connecting said color picture tube to be driven by said color video signals.

2. A system as in claim 1 wherein said means connecting said color switching circuit includes signal gating means controlled by said outputs from both said first and second signal separating means.

3. In a color television receiver for receiving line sequential color television signals the video frequency components of which have horizontal synchronizing pulse portions of which every third one is attenuated, the combination comprising first signal separating means for separating out the intermittent unattenuated horizontal synchronizing pulse portions of said color video signals and providing an output constituted of corresponding pulses of uniform amplitude, second signal separating means for separating out all the horizontal synchronizing pulse portions from said color video signals and providing an output constituted of corresponding pulses of uniform amplitude, a color switching circuit for producing color switching signals to be applied to control the color output of a color picture tube, means connecting said color switching circuit to be driven by said output of said first signal separating means, horizontal and vertical deflection circuits for producing an electron beam scan within said picture tube, said deflection circuits being connected to be driven by said output of said second signal separating means, and means connecting said color picture tube to be driven by said color video signals.

References Cited

UNITED STATES PATENTS

| | | | |
|---|---|---|---|
| 2,938,945 | 5/1960 | De France ---------- | 178—5.4 |
| 2,993,086 | 7/1961 | De France ---------- | 178—5.2 |

ROBERT L. GRIFFIN, Primary Examiner

ROBERT L. RICHARDSON, Assistant Examiner

U.S. Cl. X.R.

178—69.5